United States Patent [19]

Llamas

[11] Patent Number: 5,361,563
[45] Date of Patent: Nov. 8, 1994

[54] HORSE COVERING

[76] Inventor: Sandra A. Llamas, Rte. 1, Box 233, Subiaco, Ark. 72865

[21] Appl. No.: 145,077

[22] Filed: Oct. 29, 1993

[51] Int. Cl.⁵ .............................................. B68C 5/00
[52] U.S. Cl. ................................................... 54/79.2
[58] Field of Search ...................... 54/79.1, 79.2, 79.4; 119/850

[56] References Cited

U.S. PATENT DOCUMENTS

| | | | |
|---|---|---|---|
| 134,921 | 1/1873 | Morris | 54/79.1 |
| 215,983 | 5/1879 | Simpson | 54/79.2 |
| D. 228,926 | 10/1973 | Bennett | D30/37 |
| D. 250,138 | 10/1978 | Bartolac et al. | D30/37 |
| 754,294 | 3/1904 | Foglesong | 54/79.2 X |
| 791,372 | 5/1905 | Seaders | 54/79.2 |
| 1,437,255 | 11/1922 | Mallinson . | |
| 3,979,886 | 9/1976 | Johnson et al. . | |
| 4,214,421 | 7/1980 | Battle et al. | 54/79.2 |
| 4,355,600 | 10/1982 | Zielinski | 119/850 |
| 4,823,540 | 4/1989 | Kosarek | 54/80.1 |
| 4,955,182 | 9/1990 | Newman | 54/79.2 |
| 5,271,211 | 12/1993 | Newman | 54/79.2 |

FOREIGN PATENT DOCUMENTS 658911 10/1951 United Kingdom ................ 54/79.2

OTHER PUBLICATIONS

Sales brochure entitled "The Modulars TM Year--Round Coat Protection-The World's First Equitards TM " available from W'underwear ®, publication date 1993.
Sales brochure entitled "We Are Proud to Present ChaddsWick TM The Wickable Blanket! With Thermatex ® Fabric-the Famous British Thermal Quilt-Exclusively from W'underwear ® in the United States" available from W'underwear ®, publication date 1993.
Sales brochure entitled "CoolWalker TM Super Wicking Warm Weather Cooler & ChillBreaker TM The Breathable RainCover & Cooler In One!-W'onderful W'underwear ® Coolers!" available from W'underwear ®, publication date unknown.
Sales brochure entitled "Now for Both Summer and Winter! The W'undercover ® Hood Equitard-®-Uniquely Designed Hoods by W'underwear ®" available from W'underwear ®, publication date 1993.
Sales brochure entitled "From the Makers of the Original W'undercover ® Equine Underwear Equitards! ® No Sweat! . . . No Dirt! . . . No Work!-W'underwear ®" available from W'underwear ®, publication date 1993.
Sales brochure entitled "Spec Sheets-The Professional's Map to the Future of Horse Clothing" available from W'underwear ®, publication date 1993.

Primary Examiner—Robert P. Swiatek

[57] ABSTRACT

A one-piece covering for a horse comprising: a chest covering which covers the horse's shoulders and breast and at least partially covers the horse's withers; a hood extending from the chest covering and having a hood opening at the end thereof through which the horse's muzzle projects; a hood opening enlargement device for selectively enlarging the hood opening such that the horse's entire head can be received through the hood opening; a girth strap for securing the one piece covering to the horse; and a connecting device for releasably connecting the ends of the girth strap. The inventive covering can also include a back covering which extends from the chest covering and covers the horse's ribs, loins, haunches, and croup and at least partially covers the horse's thighs.

19 Claims, 3 Drawing Sheets

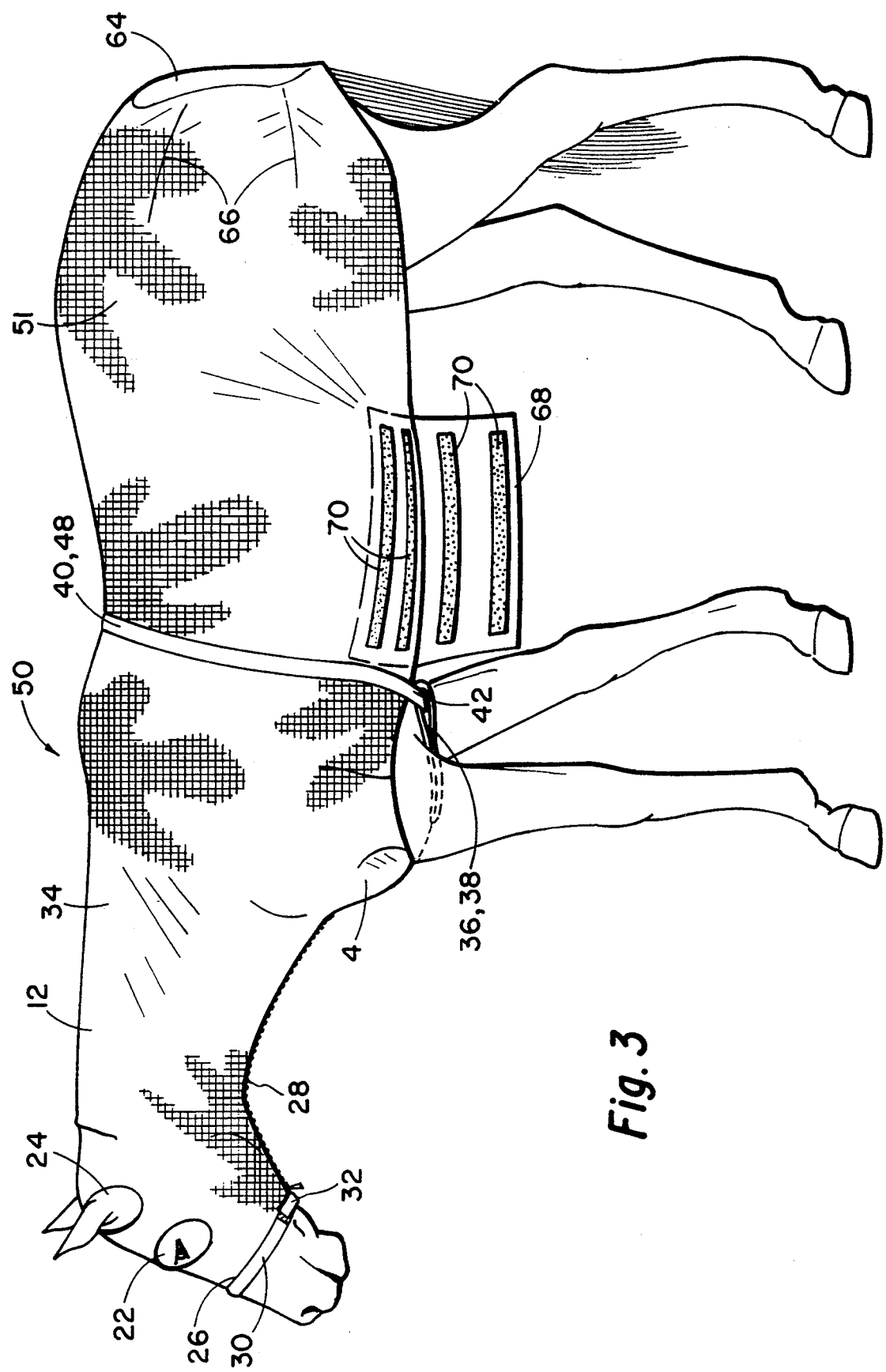

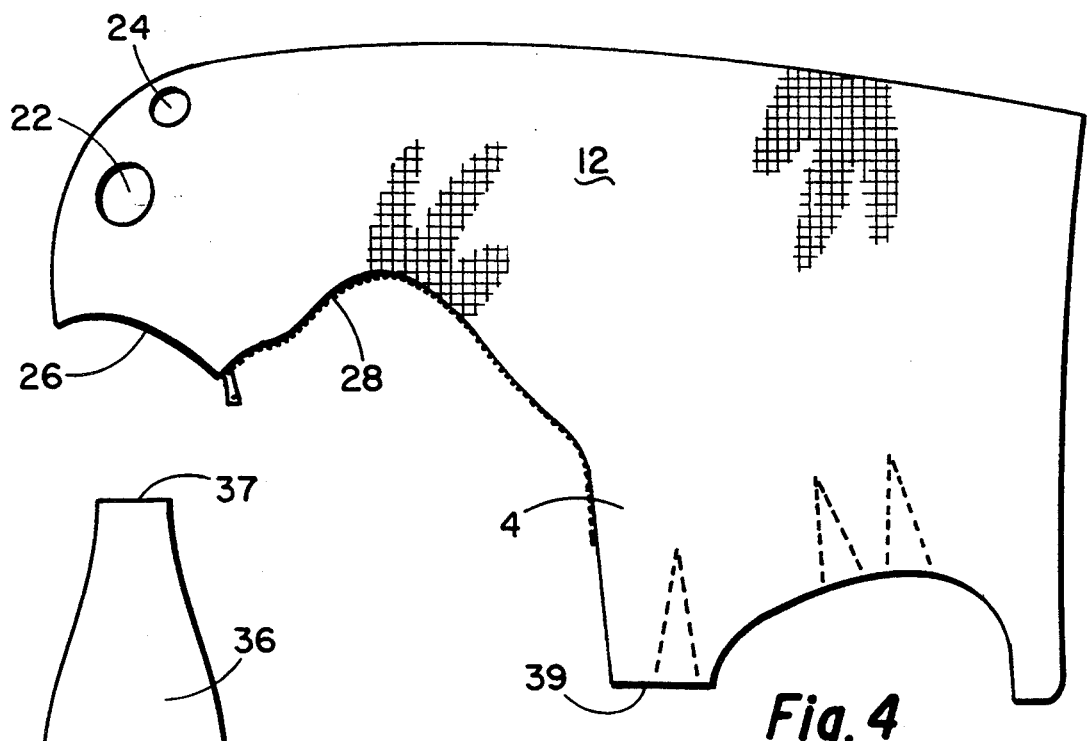
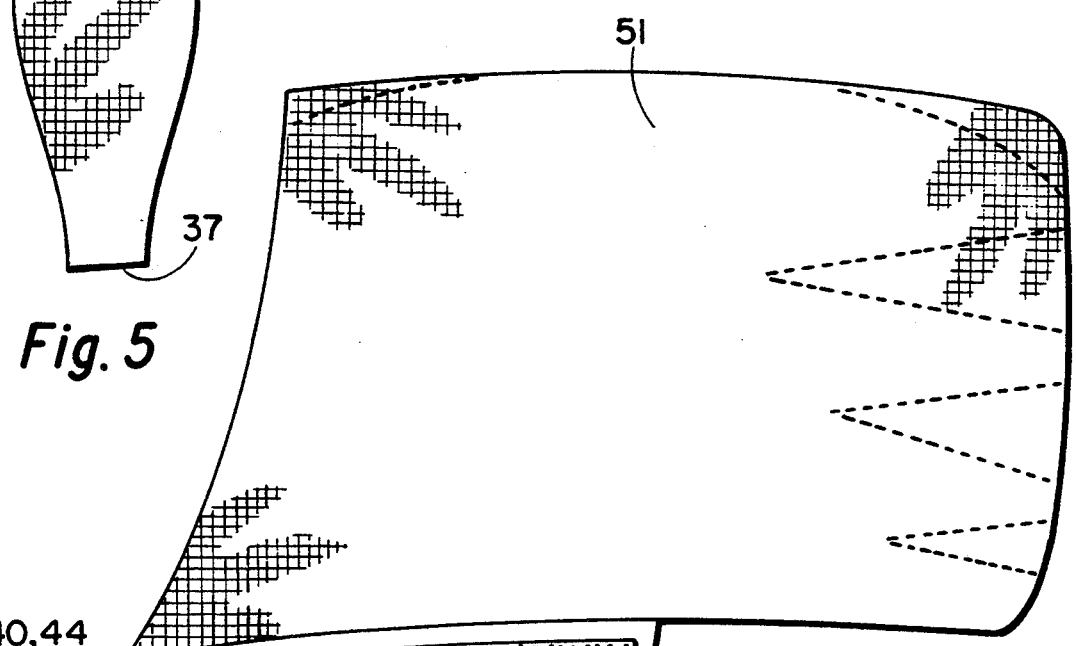
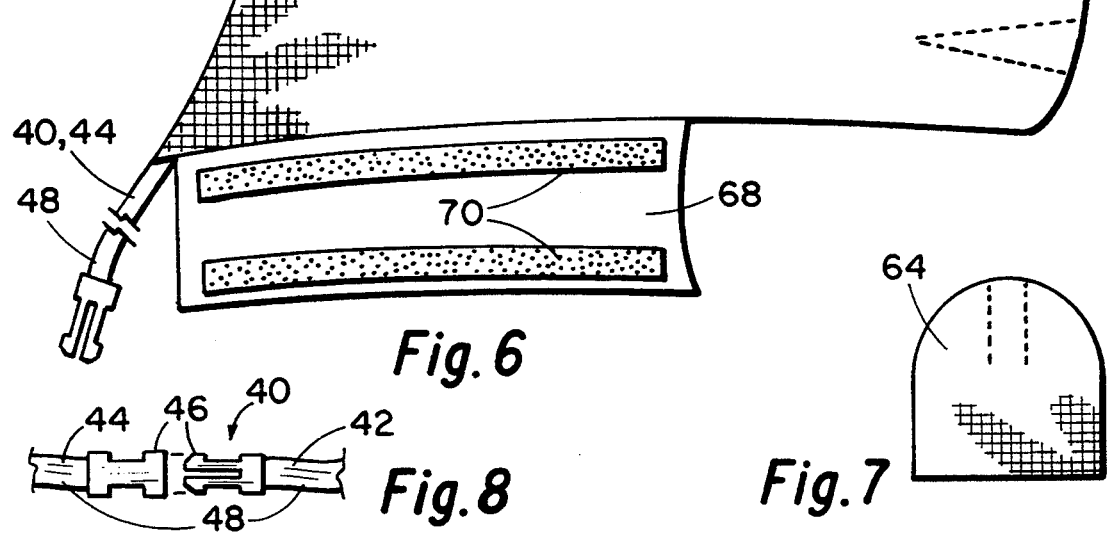
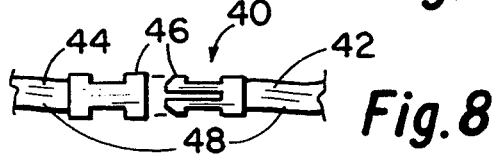
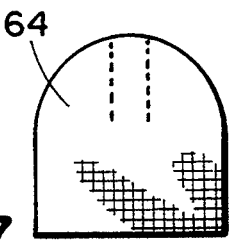

HORSE COVERING

FIELD OF THE INVENTION

The present invention relates to coverings for horses.

BACKGROUND OF THE INVENTION

A need presently exists for a cold weather horse covering which: minimizes the amount of rubbing and friction which occurs between the covering and the horse's coat and mane; provides warmth but is lightweight; keeps the horse's coat slick and shiny; can be worn under an additional blanket and will prevent blanket rubbing; is easily placed on and taken off of the horse; reduces winter coat growth for show animals; and covers the most critical parts of the horse (i.e., those portions of the horse wherein most of the horse's body heat is lost). A need particularly exists for such coverings which will cover the horse's chest, neck, and shoulders and for coverings which will cover the horse's chest, neck, shoulders, barrel, back, and thighs.

A need also exists for a lightweight, stretchable horse covering which: minimizes the amount of rubbing and friction which takes place between the covering and the horse's coat and mane; can be worn by itself in warm weather or as a liner under other sheets, blankets, and/or hoods; prevents sun bleaching; will protect the horse's mane and shoulders against blanket rubbing; will keep the horse clean and the horse's hair polished; will train the mane to lay flat; provides good air circulation; and is easily placed on and taken off of the horse. A need particularly exists for such coverings which will cover the horse's chest, neck, and shoulders and for coverings which will cover the horse's chest, neck, shoulders, barrel, back, and thighs.

SUMMARY OF THE INVENTION

The present invention provides a one-piece horse covering which satisfies all of the needs listed hereinabove. The inventive one-piece covering comprises a chest covering; a hood; and a hood opening enlargement means. When the one-piece covering is placed on the horse, the chest covering can be placed in a chest covering position wherein the chest covering covers the horse's shoulders and breast and at least partially covers the horse's withers. The hood extends from the chest covering such that, when the one-piece covering is placed on the horse, the hood can be placed in a hood position wherein the hood covers the horse's neck and forehead and preferably at least partially covers the horse's face and cheeks. The hood includes a hood opening through which the horse's muzzle will project when the hood is placed in the hood position. The hood opening enlargement means is operable for selectively enlarging the hood opening such that the horse's entire head can be received through the hood opening.

The one-piece horse covering further comprises a securing means and a connecting means. The securing means is operable for securing the one-piece covering to the horse. The securing means includes a first portion and a second portion such that, when the chest covering is placed in the chest covering position, the first portion of the securing means is positioned on one side of the horse at a location behind the horse's front leg and the second portion of the securing means is positioned on the other side of the horse at a location behind the horse's other front leg. The connecting means is operable for releasably connecting the first and second portions of the securing means when the chest covering is placed in the chest covering position.

The inventive one-piece horse covering can also include a back covering. The back covering extends from the chest covering such that, when the one-piece covering is placed on the horse, the back covering can be placed in a back covering position wherein the back covering covers the horse's ribs, loins, haunches, and croup and at least partially covers the horse's thighs.

When the inventive one-piece horse covering includes a back covering of the type just described, the inventive covering will also preferably include a belly wrap and a second securing means. The belly wrap extends from the back covering on one side of the horse when the back covering is placed in the back covering position. The securing means is operable for releasably securing the belly wrap in a wrapped position such that the belly wraps extends across the horse's belly to the portion of the back covering on the other side of the horse.

Further objects, features, and advantages of the present invention will be readily apparent to those skilled in the art upon reference to the accompanying drawings and upon reading the following description of the preferred embodiments.

BRIEF DESCRIPTION OF THE DRAWINGS

FIG. 3 provides a side view of inventive covering 50.

FIG. 4 depicts one of two matching fabric cut-outs used in forming the chest covering 4 and hood 12 portions of inventive coverings 2 and 50. The dashed markings shown in FIG. 4 indicate the locations of darts or other gatherings used to form the inventive covering such that it snugly conforms to the shape of the horse's body.

FIG. 5 depicts a fabric cut-out used in forming front flap 36. The cut-out is folded and the ends 37 thereof are sewn or otherwise connected together to form a loop 38. The connected ends 37 of front flap 36 are sewn or otherwise connected to the chest and hood pieces of location 39 shown in FIG. 4.

FIG. 6 depicts one of the corresponding fabric cut-outs used in forming the back covering 51 portion of inventive covering 50. This cut-out, which has a belly wrap 68 sewn or otherwise connected thereto, is used for forming the side of back covering 51 which is hidden from view in FIGS. 2 and 3. The dashed markings shown in FIG. 6 indicate the locations of darts or other gatherings used to form the inventive covering such that it snugly conforms to the shape of the horse's body. One end 44 of a girth strap 48 is shown extending from the FIG. 6 cut-out as would be the case when girth strap 48 is connected around back covering 51.

FIG. 7 depicts a fabric cut-out for a pleated (dashed markings) tail cap used for completing back covering 51.

FIG. 8 depicts a connecting buckle 46 used for connecting the ends of girth strap 48.

DESCRIPTION OF THE PREFERRED EMBODIMENTS

Figure 1:
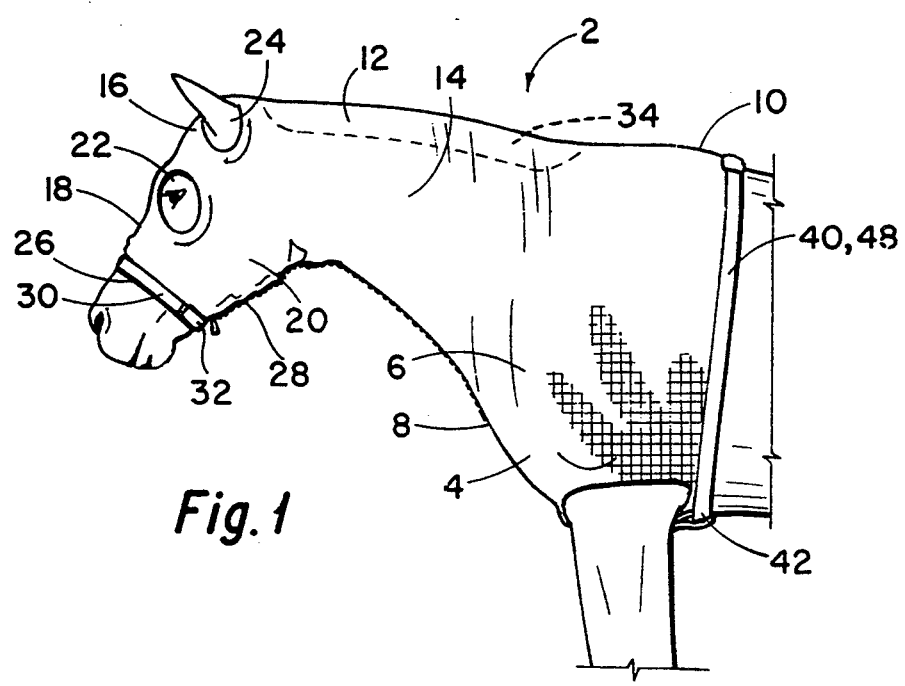
FIG. 1 provides a side view of an embodiment 2 of the inventive one-piece horse covering positioned on a horse.

A first embodiment 2 of the inventive one-piece horse covering is depicted in FIG. 1. Inventive covering 2 comprises a chest covering 4 and a hood 12. As used herein, the term "one-piece covering" refers to a garment wherein all of the various portions of the garment are attached together by permanent means and/or are portions of a continuous piece of material. The term "permanent attachment means", as used herein, refers to means (e.g., sewing or the like) wherein pieces of material are joined together in a manner such that the subsequent separation of the pieces will require that (1) at least one of the pieces be cut, ripped, torn, or otherwise damaged and/or (2) the attachment means itself (e.g., stitching) be damaged and/or destroyed.

When inventive covering 2 is positioned on a horse, chest covering 4 will cover the horse's shoulders 6 and breast 8 and will cover at least a portion of the horse's withers 10. Hood 12 will cover the horse's neck 14 and forehead 16 and will preferably at least partially cover the horse's face 18 and cheeks 20. Openings 22 and 24 are provided in the hood for the horse's eyes and ears.

Hood 12 further includes a hood opening 26 through which the horse's muzzle projects. Hood 12 also preferably includes a hood opening enlargement means 28 for selectively enlarging hood opening 26 such that the horse's entire head can be received through the hood opening. Hood opening enlargement means 28 is preferably an elongate slit or other such opening extending from hood opening 26 along the bottom of hood 12 and having a zipper installed therein. In order to facilitate the placement of inventive covering 2 on the horse and to ensure that the horse's entire head can be received through enlarged opening 26, zippered opening 28 will preferably be at least about 32 inches in length.

A muzzle strap 30 is preferably secured to the end of hood 12 around hood opening 26 such that muzzle strap 30 can be removably positioned around the horse's muzzle. Muzzle strap 30 is preferably formed from elastic or a similarly stretchable material. A securing means 32 is provided for releasably securing the muzzle strap around the horse's muzzle. Securing means 32 is preferably a VELCRO-type, i.e., Look and loop attachment.

If desired, a liner 34 for protecting and/or taming the horse's mane can be secured in the interior of hood 12. The use of a liner 34 is particularly desirable when, as discussed hereinbelow, the inventive horse covering is formed from a cold weather-type material. Liner 34 is preferably sized and secured in hood 12 such that liner 34 extends over substantially the entire length of the horse's mane. Liner 34 is preferably formed from a fabric material (e.g., nylon fabric) having a smooth, low friction surface which will cause the horse's mane to lay flat.

A front flap 36 extends from the bottom of chest covering 4. Front flap 36 has a loop 38 or similar aperture or containment means formed therein. Flap 36 is sized and positioned such that, when chest covering 4 and hood 12 are properly positioned on the horse as depicted in FIG. 1, front flap 36 can be placed between the horse's front legs with at least a portion of loop 38 extending behind the horse's front legs.

Inventive one-piece horse covering 2 further comprises a securing means 40 for securing the inventive covering on the horse. Securing means 40 preferably includes: a first portion 42 which extends downwardly on one side of the horse at a location behind the horse's front leg; a second portion 44 which extends downwardly on the other side of the horse at a location behind the horse's other front leg; and a connecting means 46 for connecting end portions 42 and 44. Portions 42 and 44 and front flap 36 are sized and positioned such that one or both of portions 42 and 44 is (are) receivable in aperture 38 of front flap 36. Connecting means 46 is operable for connecting portions 42 and 44 when the portion(s) is (are) received through aperture 38.

Securing means 40 is preferably a girth strap 48 extending around and attached to the back portion of chest covering 4, Girth strap 48 is preferably formed from elastic or some other type of stretchable material. Connecting means 46 can generally be any type of connecting means used in similar applications in the art. Connecting means 46 is preferably a quick release-type buckle.

Figure 2:
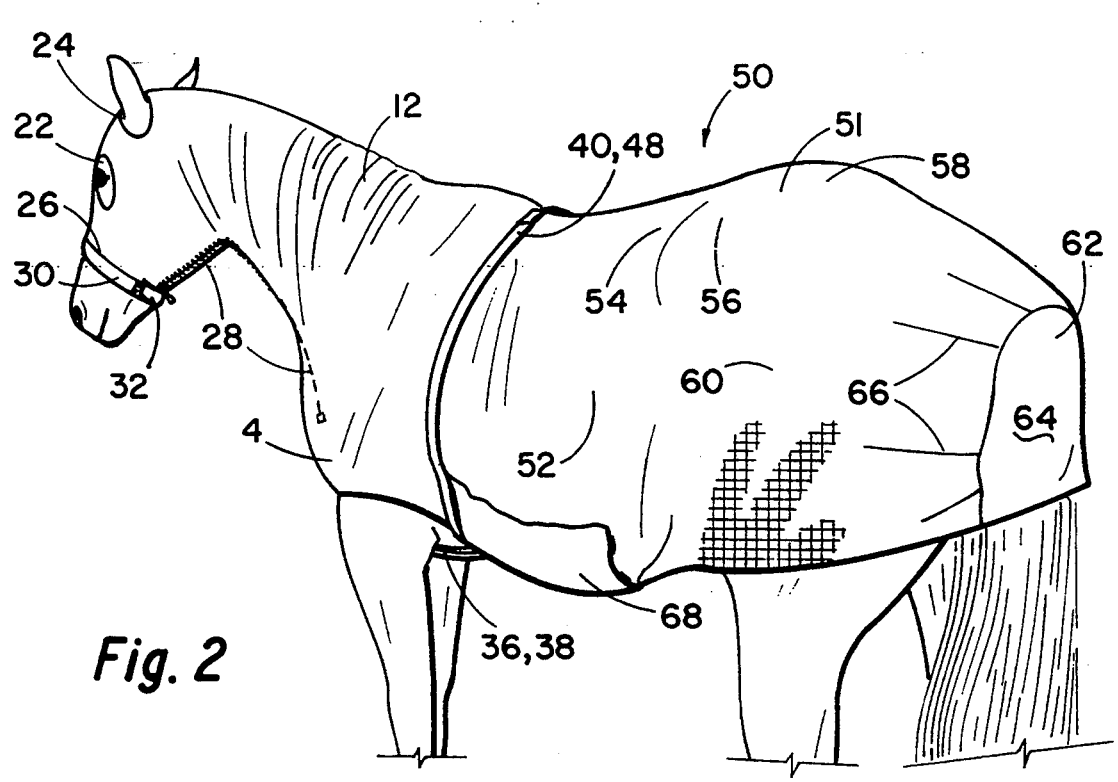
FIG. 2 provides a side and back view of an embodiment 50 of the inventive one-piece horse covering positioned on a horse.

A second embodiment 50 of the inventive horse covering is depicted in FIGS. 2 and 3. Inventive covering 50 preferably includes a chest covering 4, a hood 12, a muzzle strap 30, a front flap 36, and a securing means 40 which are substantially identical to the corresponding pieces included in inventive covering 2. However, inventive covering 50 also includes a back covering 51 which extends from the back portion of chest covering 4. Back covering 51 is preferably configured such that, when placed on the horse as depicted in FIGS. 2 and 3, back covering 5i covers the horse's ribs 52, loins 54, haunches 56, and croup 58 and covers the upper portion of the horse's tail 62 and at least a portion of the horse's thighs 60.

Back covering 51 preferably includes a pleated tail cap 64 and darts 66. Tail cap 64 and darts 66 operate to form back covering 51 such that back covering 51 fits closely over the horse's thighs, rump, and tail.

Back covering 51 further preferably comprises a belly wrap 68 which extends downwardly on one side of the horse from the bottom portion of back covering 51. Belly wrap 68 is preferably sized such that it can be snugly wrapped around the horse's belly and will overlap a portion of the other side of back covering 51. A securing means 70 is provided for releasably securing belly wrap 68 to the other side of back covering 51 such that belly wrap 68 can be retained in wrapped position across the horse's belly. Securing means 70 is preferably a VELCRO-type, i.e. Look and loop closure.

The fabric portions of inventive horse coverings 2 and 50 are preferably formed from a fabric material which is at least slightly stretchable. Inventive coverings 2 and 50 are preferably sized such that, when placed on the horse, the inventive coverings are held in a slightly stretched position such that the coverings are maintained in snug or tight conformity with the horse's body. The snug, stretched fit of the inventive covering operates to limit the amount of relative movement which occurs between the horse's body and the garment and thereby minimizes the amount of friction and wear to which the horse's coat and mane are exposed. The snug, stretchable fit of the inventive covering also provides a high degree of freedom of movement for the horse.

For cold weather applications, inventive coverings 2 and 50 can be formed from a warm, stretchable material (e.g., a cold weather polyester material). An example of a warm, stretchable material particularly preferred for use in the present invention is POLARPLUS synthetic fleece available from Malden Mills. POLARPLUS synthetic fleece is an extremely warm material which weighs about 50% less than real wool. POLARPLUS synthetic fleece will stretch to provide both a good fit and freedom of movement. Additionally, POLARPLUS synthetic fleece effectively wicks away perspiration, absorbs very little water when wet, provides warmth even when damp, and can be conveniently washed and dried without shrinking.

For extremely cold weather applications, an additional hood and/or blanket can be placed over the inventive cold weather coverings. In such cases, the inventive coverings operate to provide additional warmth and to reduce the amount of rubbing and chafing which would otherwise be caused by the outer garment(s).

For warm weather applications or in applications where very lightweight friction reducing liners are required, inventive one-piece coverings 2 and 50 can be formed from a lightweight, stretchable material such as a nylon spandex fabric or a similar fabric material. Spandex fabrics are highly stretchable in all directions. Thus, an inventive covering formed from spandex material can be tightly fitted to the horse in a stretch condition so that relative movement between the horse and the garment is minimized. Additionally, spandex materials have smooth finishes which will minimize the amount of friction occurring between the inventive covering and the horse's coat and between the inventive covering and any additional covering placed thereon. The spandex material will also cause the horse's hair and mane to lay flat. Further, the spandex material will protect the horse's coat from mud, sun bleaching, friction, etc. while allowing air to circulate therethrough.

Both the cold weather and warm weather versions of the inventive one-piece coverings can be easily and conveniently placed on and taken off of the horse. When placing one of the inventive coverings on a horse, hood opening 26 is enlarged by opening zipper 28 so that the horse's head can be placed therethrough. With the one-piece garment thus positioned on the horse, hood 12 can be extended and placed in position over the horse's neck, forehead, face, and cheeks as depicted in FIGS. 1–3. Zipper 28 is then closed and muzzle strap 30 is secured around the horse's muzzle using attachment means 32.

Before, during, or while positioning hood 12 in the manner just described, chest covering 4 can be secured to the horse by placing front flap 36 between the horse's front legs, running one of the ends of girth strap 48 through the aperture 38 formed in flap 36, and then snugly securing the end portions 40 and 42 of girth strap 48 together using connecting means 46.

If the inventive covering includes a back covering 51, the back covering is extended to cover the horse's back as depicted in FIGS. 2 and 3. With the back covering thus in place, belly wrap 68 can be wrapped across the horse's belly and secured to the other side of back piece 51 using securing means 70.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A one-piece covering for a horse comprising:

a chest covering which, when said one-piece covering is placed on the horse, can be placed in a chest covering position wherein said chest covering covers the horse's shoulders and breast and at least partially covers a portion of the horse's withers;

a hood extending from said chest covering which, when said one-piece covering is placed on the horse, can be placed in a hood position such that the hood covers the horse's neck and forehead, said hood having a hood opening through which the horse's muzzle will project when said hood is placed in said hood position;

a hood opening enlargement means for selectively enlarging said hood opening such that the horse's entire head can be received through said hood opening;

first securing means for securing said one-piece covering to the horse, said first securing means including a first portion and a second portion such that, when said chest covering is placed in said chest covering position, said first portion of said securing means is positioned on one side of the horse at a location behind the horse's front leg and said second portion of said securing means is positioned on the other side of the horse at a location behind the horse's other front leg;

connecting means for releasably connecting said first and second portions of said first securing means when said chest covering is placed in said chest covering position; and a front flap which extends from said chest covering such that, when said chest covering is placed in said chest covering position, said front flap can be positioned between the horse's front legs, said front flap having an aperture provided therein;

wherein at least one of said first and second portions of said first securing means is receivable in said aperture when said front flap is positioned between the horse's front legs; and wherein said connecting means is operable for releasably connecting said first and second portions of said first securing means when said chest covering is placed in said chest covering position, said front flap is positioned between the horse's front legs, and said at least one portion of said securing means is received in said aperture.

2. The one-piece covering of claim 1 wherein said hood opening enlargement means is an elongate opening extending from said hood opening and having a zipper installed therein for closing said elongate opening.

3. The one-piece covering of claim 1 further comprising:

a muzzle strap secured to said hood such that, when said hood is placed in said hood position, said muzzle strap is positionable around the horse's muzzle and a second securing means for releasably securing said muzzle strap around the horse's muzzle.

4. The one-piece covering of claim 1 further comprising a nylon liner secured in said hood such that said nylon liner at least partially covers the horse's mane when said hood is placed in said hood position.

5. The one-piece covering of claim 1 wherein said chest covering and said hood are formed from a spandex material.

6. The one-piece covering of claim 1 wherein said chest covering and said hood are formed from a synthetic fleece material.

7. The one-piece covering of claim 1 further comprising a back covering extending from said chest covering such that, when said one-piece covering is placed on the horse, said back covering can be placed in a back covering position wherein said back covering covers the horse's ribs, loins, haunches, and croup and at least partially covers the horse's thighs.

8. A one-piece covering for a horse comprising:
   a chest and back covering which, when said one-piece covering is placed on the horse, can be placed in a chest and back covering position wherein said chest and back covering covers the horse's shoulders, breast, withers, ribs, back, loins, haunches, and croup and at least partially covers the horse's thighs;
   a hood extending from said chest and back covering which, when said one-piece covering is placed on the horse, can be placed in a hood position wherein said hood covers the horse's neck and forehead, said hood having a hood opening through which the horse's muzzle will project when said hood is placed in said hood position;
   a hood opening enlargement means for selectively enlarging said hood opening such that the horse's entire head can be received through said hood opening;
   first securing means for securing said one-piece covering to the horse, said securing means including a first portion and a second portion and said securing means being attached to said chest and back covering such that, when said chest and back covering is placed in said chest and back covering position, said first portion extends from said chest and back covering on one side of the horse at a point behind the horse's front leg and said second portion extends from said chest and back covering on the other side of the horse at a point behind the horse's other front leg; and
   connecting means for releasably connecting said first and second portions of said securing means when said chest and back covering is placed in said chest and back covering position.

9. The one-piece covering of claim 8 wherein:
   said one-piece covering further comprises a front flap which extends from said chest and back covering such that, when said chest and back covering is placed in said chest and back covering position, said front flap can be positioned between the horse's front legs, said front flap having an aperture provided therein;
   at least one of said first and second portions of said first securing means is receivable in said aperture when said front flap is positioned between the horse's front legs; and
   said connecting means is operable for releasably connecting said first and second portions of said first securing means when said chest and back covering is placed in said chest and back covering position, said front flap is positioned between the horse's front legs, and said at least one portion of said securing means is received in said aperture.

10. The one-piece covering of claim 8 further comprising:
    a belly wrap which extends from said chest and back covering on one side of the horse when said chest and back covering is placed in said chest and back covering position and
    second securing means for releasably securing the belly wrap in a wrapped position such that the belly wrap extends across the horse's belly to the portion of said chest and back covering on the other side of the horse.

11. The one-piece covering of claim 10 wherein said second securing means is a VELCRO closure.

12. The one-piece covering of claim 8 wherein said hood opening enlargement means is an elongate opening extending from said hood opening and having a zipper installed therein for closing said elongate opening.

13. The one-piece covering of claim 8 further comprising:
    a muzzle strap secured to said hood such that, when said hood is placed in said hood position, said muzzle strap is positionable around the horse's muzzle and
    a second securing means for releasably securing said muzzle strap around the horse's muzzle.

14. The one-piece covering of claim 8 further comprising a mane taming means, secured in said hood, for taming the horse's mane.

15. The one-piece covering of claim 8 wherein said chest and back covering and said hood are formed from a spandex material.

16. The one-piece covering of claim 8 wherein said chest and back covering and said hood are formed from a synthetic fleece material.

17. A one-piece covering for a horse comprising:
    a chest covering which, when said one-piece covering is placed on the horse, can be placed in a chest covering position wherein said chest covering covers the horse's shoulders and breast and at least partially covers a portion of the horse's withers;
    a hood extending from said chest covering which, when said one-piece covering is placed on the horse, can be placed in a hood position such that the hood covers the horse's neck and forehead, said hood having a hood opening through which the horse's muzzle will project when said hood is placed in said hood position;
    a hood opening enlargement means for selectively enlarging said hood opening such that the horse's entire head can be received through said hood opening;
    first securing means for securing said one-piece covering to the horse, said first securing means including a first portion and a second portion such that, when said chest covering is placed in said chest covering position, said first portion of said securing means is positioned on one side of the horse at a location behind the horse's front leg and said second portion of said securing means is positioned on the other side of the horse at a location behind the horse's other front leg;
    connecting means for releasably connecting said first and second portions of said first securing means when said chest covering is placed in said chest covering position; and
    a back covering extending from said chest covering such that, when said one-piece covering is placed on the horse, said back covering can be placed in a back covering position wherein said back covering covers the horse's ribs, loins, haunches, and croup and at least partially covers the horse's thighs.

18. The one-piece covering of claim 17 further comprising:
a belly wrap which extends from said back covering on one side of the horse when said back covering is placed in said back covering position and
second securing means for releasably securing said belly wrap in a wrapped position such that the belly wrap extends across the horse's belly to the portion of said back covering on the other side of the horse.

19. The one-piece covering of claim 18 wherein said second securing means is a VELCRO closure.

* * * * *